United States Patent
Le Bricquer et al.

(10) Patent No.: US 6,244,640 B1
(45) Date of Patent: Jun. 12, 2001

(54) GRIPPING DEVICE

(75) Inventors: Gérard Le Bricquer, Le Chesnay; Alain Vezinet, Athis-Mons, both of (FR)

(73) Assignee: Societe Opema S.A., Athis Mons (FR)

(*) Notice: Subject to any disclaimer, the term of this patent is extended or adjusted under 35 U.S.C. 154(b) by 0 days.

(21) Appl. No.: 09/371,163

(22) Filed: Aug. 10, 1999

(30) Foreign Application Priority Data

Aug. 13, 1998 (FR) .................................................. 98 10495

(51) Int. Cl.⁷ .............................. B25J 15/06; B25J 19/02
(52) U.S. Cl. .......................................... 294/64.1; 294/907
(58) Field of Search .................... 294/64.1, 64.2, 294/64.3, 65, 907; 901/40, 46, 47; 414/627, 737; 271/90, 103, 108

(56) References Cited

U.S. PATENT DOCUMENTS

| | | | |
|---|---|---|---|
| 4,189,137 | * 2/1980 | Denney et al. | ........... 271/103 |
| 4,266,905 | * 5/1981 | Birk et al. | ........... 294/64.1 |
| 4,640,503 | * 2/1987 | Naumann | ........... 271/103 |
| 4,651,396 | * 3/1987 | Kerlidou | ........... 294/64.1 |
| 4,662,668 | * 5/1987 | Hufford | ........... 294/64.1 |
| 4,763,941 | * 8/1988 | Sniderman | ........... 414/627 |
| 5,308,132 | * 5/1994 | Kirby et al. | ........... 294/907 |
| 5,572,785 | * 11/1996 | Tveit | ........... 901/40 |
| 6,065,789 | * 5/2000 | Nagai et al. | ........... 294/64.1 |

FOREIGN PATENT DOCUMENTS 2604-984 * 4/1988 (FR) .................................. 294/64.1

* cited by examiner

Primary Examiner—Dean J. Kramer
(74) Attorney, Agent, or Firm—Herbert Dubno

(57) ABSTRACT

A gripping device including a suction tube connected to a suction source and a tublar nozzle which surrounds a portion of this tube so as to be movable along the tube while delimiting therewith a tubular calibrated gap which generates a laminat effect moving the nozzle towards an external stop position where no object is gripped by the nozzle so as to be deteced by an opto-electronic fork.

6 Claims, 2 Drawing Sheets

GRIPPING DEVICE

BACKGROUND OF THE INVENTION

The present invention concerns a suction gripping device and any similar device of this type which automatically signifies the picking up of an object.

SUMMARY OF THE INVENTION

The device of the invention, which includes a nozzle connected to a suction source, is characterized in that the nozzle is mounted sliding with play on the end of the suction tube and in that it includes stops to limit the travel of the nozzle towards the inside and outside, as well as means to indicate that the nozzle occupies its extreme internal position.

When no object is picked up by the device of the invention, an amount of air is sucked up from the outside by means of the play existing between the tube and the nozzle, and, via a laminar effect, tends to move towards the outside the nozzle which comes into its external stop position. When the opening of the nozzle is blocked off by an object, even partially, this object is sucked up and drives towards the inside the nozzle which comes into its extreme internal position which indicates the picking up of an object.

In a particular embodiment of the invention, the device includes a cylindrical body comprising a transversal wall in which the suction tube is fitted on and against which the nozzle stops when it moves towards the inside.

The gripping device of the invention can be used in an extremely wide range of applications, such as in the food, mechanical, electronic or pharmaceutical industries.

BRIEF DESCRIPTION OF THE DRAWINGS

There now follows a non-restrictive example of an embodiment of the gripping device of the invention with reference to the accompanying drawings on which

DETAILED DESCRIPTION OF THE PREFERRED EMBODIMENTS

Figure 1:
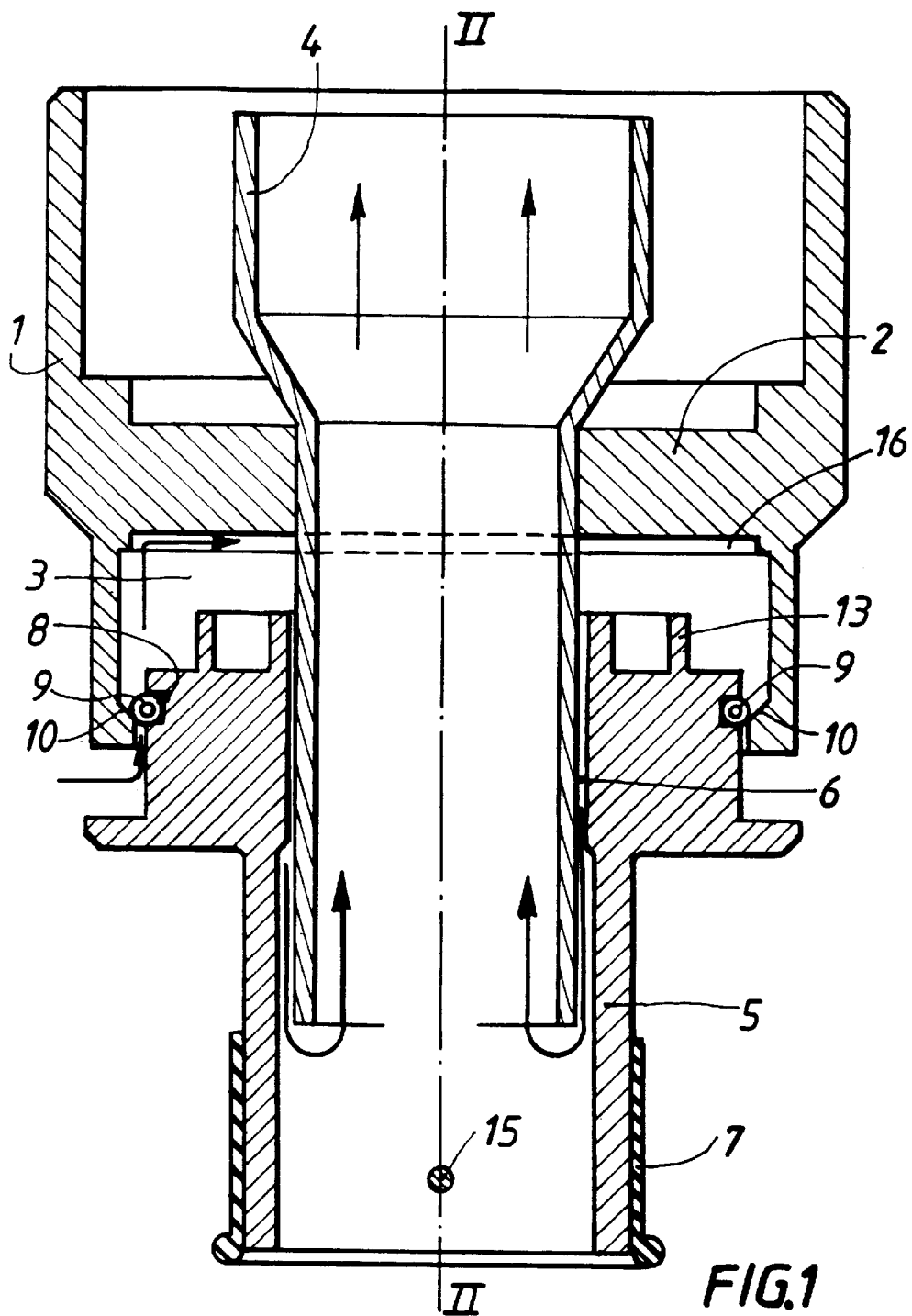
FIG. 1 is an axial cutaway view of the device along the section line I—I of FIG. 2, the mobile nozzle being in the bottom position.

As shown on the drawing, the gripping device of the invention includes a cylindrical body 1 comprising a transversal wall 2 which delimits a chamber 3. Inside this wall, a suction tube 4 is fitted and is intended to be connected to a suction source (not shown) and extends into the chamber.

A nozzle 5 is mounted and able to move with calibrated play 6 on the portion of the tube 4 extending into the chamber 3. A circular rubber joint 7 is fitted on the end of the nozzle 5. At its lower end, this nozzle comprises a throat 8 housing a toric spring 9. This spring allows air to enter the chamber 3 and cooperates with an internal shoulder 10 of the body 1 to prevent the nozzle 5 from being separated from the tube 4.

Figure 2:
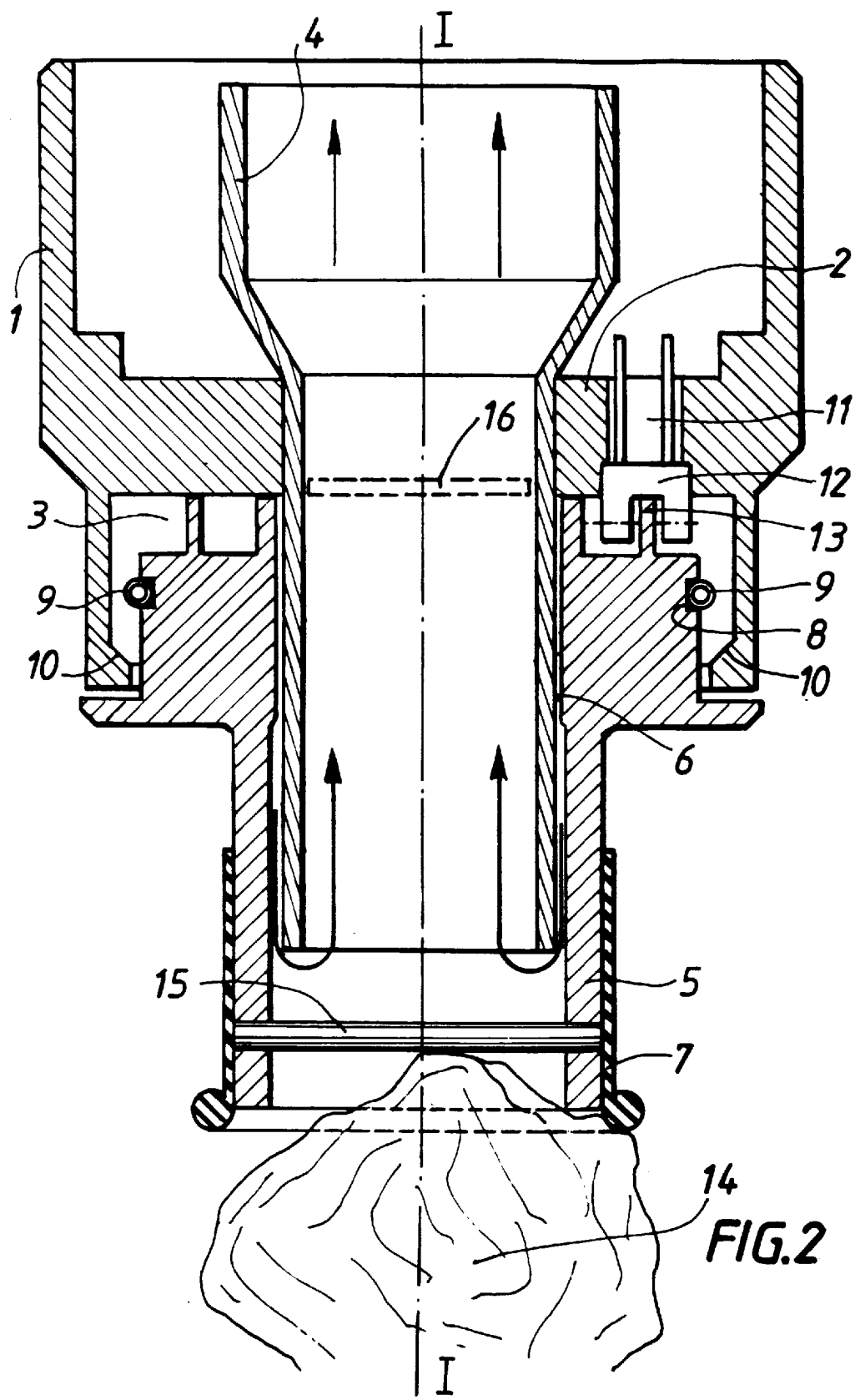
FIG. 2 is an axial cutaway view of the device along the section line II—II of FIG. 1, the mobile nozzle being in the upper position.

The partition 2 comprises a recess 11 housing an opto-electronic fork 12 (FIG. 2) projecting into the branch 3. The nozzle 5 has on its upper face an annular disk 13 cutting the beam of the fork 12 when the nozzle is in the high position.

A wire 15 is placed transversally in the end of the nozzle 5 and limits the passage section of this nozzle. Close to the partition 2, the chamber 3 comprises an opening 16 opening towards the outside.

During functioning, the tube 4 is connected to a suction source. Under the effect of a partial vacuum, air is sucked up from the chamber 3 and moves into the clearance 6. Via a laminar effect, this air tends to move the nozzle 5 downwards with respect to the tube 4 which is fixed and brings this nozzle into the extreme outer position of FIG. 1 in which the spring 9 is on contact with the shoulder 10, the ring 13 being located outside the fork 12.

When an object 14 blocks the opening of the nozzle, even partially, this object tends to be sucked into the tube 4 and moves the nozzle 5 which comes into its extreme internal position to stop against the wall 2. The ring 13 penetrates into the opto-electronic fork 12 (FIG. 2), thus indicating the picking up of the object 14.

If the nozzle loses the object, for example on account of an impact or excessive vibrations, the air penetrates into the chamber 3 via the opening 16 and the nozzle returns to its low position as indicated on FIG. 1.

The wire 15 makes it possible to pick up relatively small objects, thus preventing them from being sucked into the tube 14 without impeding the passage of the air.

It goes without saying that the present invention is not to be considered as limited to the embodiment described and shown, but on the contrary covers all possible variants. This is why it is possible to provide elastic means tending to bring the nozzle 5 into its extreme internal position. In this case, the nozzle would occupy this position in the absence of suction, would come into its extreme outer position when the tube 4 is connected to the suction source, and would return to its extreme internal position when an object is picked up.

What is claimed is:

1. A suction device for gripping an object, said device comprising a suction tube connected to a suction source and a tubular nozzle which surrounds a portion of said tube so as to be movable along said tube portion while delimiting therewith a tubular calibrated gap through which an amount of air is aspired and generates a laminar effect which moves said nozzle towards an external stop position when said object is not gripped by said nozzle while when the object is sucked up by said nozzle and is blocked off, said object drives the nozzle towards an extreme internal position, sensing means being provided for indicating that the nozzle is in said extreme internal position.

2. A suction device according to claim 1 which comprises a cylindrical body having a transversal wall in which said suction tube is fitted and against which said nozzle stops in the said extreme internal position.

3. A suction device according to claim 2, which further comprises a circular joint, fitted on an end of the said nozzle.

4. A suction device according to claim 2 which comprises a wire placed transversally in an end of said nozzle.

5. A suction device for gripping an object, said device comprising a suction tube connected to a suction source and a tubular nozzle which surrounds a portion of said tube so as to be movable along said tube portion while delimiting therewith a tubular calibrated gap through which an amount of air is aspired and generates a laminar effect which moves said nozzle towards an external stop position when said object is not gripped by said nozzle while when the object is sucked up by said nozzle and is blocked off, said object drives the nozzle towards an extreme internal position, sensing means being provided for indicating that the nozzle is in said extreme internal position, said suction device further comprising toric spring engaged in a throat of the nozzle and stopped against a fixed shoulder of the suction tube when said nozzle is in said external stop position.

6. A suction device for gripping an object, said device comprising a suction tube connected to a suction source and a tubular nozzle which surrounds a portion of said tube so as to be movable along said tube portion while delimiting therewith a tubular calibrated gap through which an amount of air is aspired and generates a laminar effect which moves said nozzle towards an external stop position when said object is not gripped by said nozzle while when the object is sucked up by said nozzle and is blocked off, said object drives the nozzle towards an extreme internal position, said suction device further comprising an opto-electronic fork borne by a transversal wall and an annular disk fixed on said nozzle so as to penetrate in said fork when said nozzle is in the said extreme internal position.

* * * * *